United States Patent [19]

Bartlett et al.

[11] 3,881,172

[45] Apr. 29, 1975

[54] PROCESS CONTROL COMPUTER

[75] Inventors: Peter G. Bartlett; Donald E. Henry, both of Davenport, Iowa

[73] Assignee: Struthers-Dunn, Inc., Pitman, N.J.

[22] Filed: Mar. 30, 1973

[21] Appl. No.: 346,507

Related U.S. Application Data

[63] Continuation-in-part of Ser. No. 203,570, Dec. 1, 1971, Pat. No. 3,761,882.

[52] U.S. Cl. .............................................. 340/172.5

[51] Int. Cl. .............................................. G06f 9/00

[58] Field of Search ...................... 340/172.5; 444/1

[56] References Cited

UNITED STATES PATENTS

| | | | |
|---|---|---|---|
| 3,570,006 | 3/1971 | Hoff et al. | 340/172.5 |
| 3,670,306 | 6/1972 | Fox et al. | 340/172.5 |
| 3,671,945 | 6/1972 | Maggio | 340/172.5 |
| 3,696,338 | 10/1972 | Preiss | 340/172.5 |
| 3,704,448 | 11/1972 | Osborne | 340/172.5 |
| 3,737,870 | 6/1973 | Carter et al. | 340/172.5 |
| 3,742,457 | 6/1973 | Calle et al. | 340/172.5 |

*Primary Examiner*—Gareth D. Shaw
*Assistant Examiner*—Mark Edward Nusbaum
*Attorney, Agent, or Firm*—Hall & Myers

[57] ABSTRACT

A solid state process control computer for continually controlling a plurality of outputs in dependence upon the conditions of a plurality of continually variable input parameters. The controller includes a memory capable of storing a large number of multi-bit words each comprising both an address and an instruction. The memory is scanned on a word-by-word basis at high speed. A central processing means is provided and a data input/output bus is connected both to the input and the output of the central processing means. As each word in the memory is scanned, the instruction portion of each scanned word selectively either enables the central processing means to receive data from the input/output bus or it enables the input/output bus to receive data from the central processing means. The address portion of each scanned word in the memory operatively connects any one of a plurality of registers to the input/output bus. A register may either be connected so as to be responsive to an input parameter or it may be connected so as to control an output device. The memory comprises a matrix having a large plurality of intersections each including a fused diode. The placing of a word in the memory is accomplished by selectively open circuiting one or more of the fused diodes corresponding respectively to the different bits of each word in the memory.

The process control computer can also execute a jump instruction in response to variable input data. The jump instruction is implemented, when effective, by inhibiting the central processing unit from writing output data in the output registers. Thus, each of the instructions which are jumped, is read out of memory, and executed as any other instruction, but the result is unable to reach the output registers.

3 Claims, 8 Drawing Figures

CONTROLLER PROGRAM

| ENGLISH | CODE FORM |
|---|---|
| 1. LDA 000 | 100 000000000 |
| 2. AUX 509 | 111 111111101 |
| 3. LDA A | 100 A |
| 4. AUX 510 | 111 111111110 |
| 5. LDA B | 100 B |
| 6. OR C | 010 C |
| 7. AND D | 000 D |
| 10. STO J | 110 J |
| 11. LDA E | 100 E |
| 12. AND M | 000 M |
| 13. STO K | 110 K |
| 14. LDA E | 100 E |
| 15. AND F | 000 F |
| 16. STO K | 110 K |
| 17. LDA E | 100 E |
| 20. AND G | 000 G |
| 21. STO L | 110 L |

CONTROLLER PROGRAM

1. LDA O
2. AUX 510
3. LDA J
4. AUX 509
5. LDA A
6. OR E
7. AND B
10. AND C
11. AND D
12. STO U
13. LDA F
14. AND G
15. AND H
16. STO V
17. LDAC J
20. AUX 509
21. LDA A
22 OR C
23. OR D
24. AND B
25. STO U
26. LDA I
27. STO V

PROCESS CONTROL COMPUTER

RELATED APPLICATION

This application is a continuation-in-part of application Ser. No. 203,570, filed Dec. 1, 1971 now U.S. Pat. No. 3,761,882, issued Sept. 25, 1973, and assigned to the assignee of this application.

BACKGROUND OF THE INVENTION

For a discussion of the background of this invention see the above-referred to co-pending application.

SUMMARY OF THE INVENTION

As is well understood in the art of digital computing the jump instruction is a very powerful programming tool. However, in evey instance in which the applicants are aware of the prior art utilizing a jump instruction, the program storage was of the read-write variety, allowing the program itself to be changed during the course of executing the program. However, for economical and maintenance reasons, the applicants have chosen to employ a read only memory in their variable industrial programmer, disclosed in their prior co-pending application referred to above. The present invention discloses apparatus which is capable of executing a jump instruction, in response to variable input data, where the program is stored in a read-only memory.

In the prior art general purpose digital computers, a jump instruction, located at memory location A, is executed by directing the computer to read the next instruction to be executed, not from memory address A+1, but from some other memory address. In other words, the program actually skips (or loops back) a number of memory locations in which are stored instructions which are not to be executed. The apparatus disclosed in the instant application performs the same function but implements the jump instruction in a different manner. As will be seen in a detailed description of the process control computer disclosed herein, the instructions are sequentially read out of memory, each instruction being executed prior to the next instruction being read out. In this fashion, the entire program is executed from beginning to end, in sequence. When a jump instruction is read out, it is necessary to sense the appropriate input data to determine whether or not the particular jump instruction is to be effective at that time. If it is, then a register is reset in response thereto and the succeeding instructions are read out and the data manipulations called for by that instruction are effected. However, the resetting of the particular register in response to the effective jump instruction inhibits the central processor of the computer from communicating with the output registers. As a result, the data manipulations and computations performed subsequent to sensing an effective jump instruction have no effect on the computer outputs. It is, to the outside world, as if a portion of the program had been jumped. In order to terminate such an effective jump instruction, another instruction is provided to set the particular register so that, after the particular register has been set, the data manipulations and computations performed by the central processor can thereafter again be effective to write results in the output registers. Insofar as the output registers are concerned (and these are the registers which communicate the computation results to the outside world), when a jump instruction has been executed in the computer disclosed herein, although the computations are performed just as if no jump instruction had been provided, the output registers status is not altered, and the outward appearance is just as if a portion of the program had been skipped or jumped.

BRIEF DESCRIPTION OF THE DRAWINGS

In describing this invention, reference will be made to the accompanying drawings in which.

DETAILED DESCRIPTION OF THE PREFERRED EMBODIMENT

Figure 1:
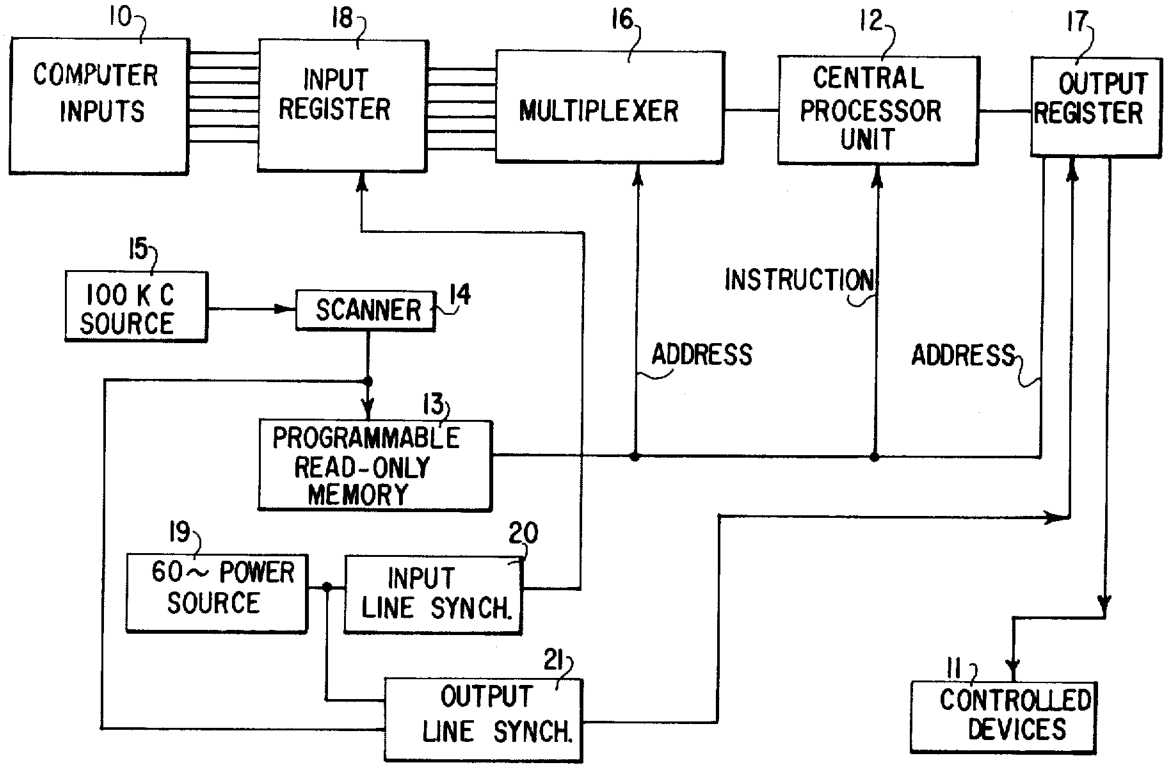
FIG. 1 is a general block diagram of the controller of this invention.

A general block diagram of the controller of this invention is shown in FIG. 1. The controller of the invention is interfaced between computer inputs 10 which represents the continuously variable input parameters to which the controller responds, and controlled devices 11 which represents the various outputs that are controlled in accordance with the computations made by the computer.

The heart of the apparatus comprises the central processor unit 12 which includes apparatus for performing three basic computational operations. Thus, the CPU includes an AND capability, an OR capability, and a NOT capability. This is the equivalent of having one set of series-connected relay contacts, one set of parallel-connected relay contacts, and a normally closed contact. The processor shares this one group of elements, using only one as each word is read from the memory, to make all of the decisions required for the control system. One decision is made at a time utilizing the three basic logic elements. The controller operates on a step-by-step basis, on each step performing a discrete function which may involve any one of the following: (a) operatively connecting the CPU 12 to a particular one of the computer inputs 10; (b) performing a particular one of the three logic functions referred to above with two different information bits, one being a bit then stored in an accumulator forming a part of the CPU 12 and the other being a bit stored in either an input register or an output register; and (c) transferring the data then stored in the accumulator of the CPU to an output register.

The selection of which function to perform on any given processing step is determined by a programmable read-only memory 13 which is driven by a scanner 14 that is in turn driven by a 100 Kc. source 15. The read-only-memory (ROM) 13 stores a plurality of words each comprising both an address portion and an instruction portion. The instruction portion of each word is applied to the CPU 12 and selects the particular logic function which is to take place at any given time. The address portion of each word in the memory is applied both to a multiplexer 16 and to an output register 17. This address portion of each word is used to determine which of the various computer inputs 10 is to be applied to the CPU 12 or which of the various individual registers in the output register 17 is to have transferred to it the data bit then held in the CPU.

The ROM 13 is scanned one word at a time by scanner 14 which, in effect, comprises a ring counter driven at the 100 Kc. rate established by source 15. Consequently, the ROM 13 advances from one word to the next repeatedly each 10 microseconds so that a new instruction is provided each 10 microseconds to the CPU 12. It will thus be apparent that a great many words can be stored in the memory 13 and a correspondingly great number of computations can be carried out by the CPU 12 in only a few milliseconds, with the result that the conditions of the controlled devices accurately reflect the conditions of the input parameters determined by computer inputs 10.

On a typical cycle, all of the inputs represented by computer inputs 10 are gated into an input register 18 and stored in that register 18. Such gating of the inputs to register 18 is timed to occur at the time that the 60-cycle power source is at its maximum amplitude. Thus, the 60-cycle power source 19 controls apparatus which is termed the input line synch 20 of FIG. 1, and the latter apparatus provides an input pulse to input register 18 upon each occurrence of maximum amplitude of the power source so that the input register 18 receives an enabling input at the rate of 120 pulses per second. The manner in which this pulse is provided has been effected with a "line synchronized trigger circuit" such as that shown on page 29 of the General Electric "Transistor Manual", copyright 1964. Since the power source frequency is a predetermined constant and the period of time elapsed between the zero crossing and the point of maximum voltage is known, the signal produced by the "line synchronized trigger circuit" is then delayed by the necessary period of time by a monostable multivibrator such as that shown on page 201 of the same manual. A further monostable multivibrator is then used to generate the pulse which is directed to the input register 18.

The 60-cycle power source 19 also controls operation of the output line synch 21 which provides an output to the ouptput register 17. The output line synch is controlled to provide such enabling pulse to the output register 17 upon each occurrence of the zero crossing point of the cycle power source thereby enabling the output register 17 to respond to all the computations made during the just-completed scan and control the various controlled devices 11 in accordance with those computations.

Figure 2:
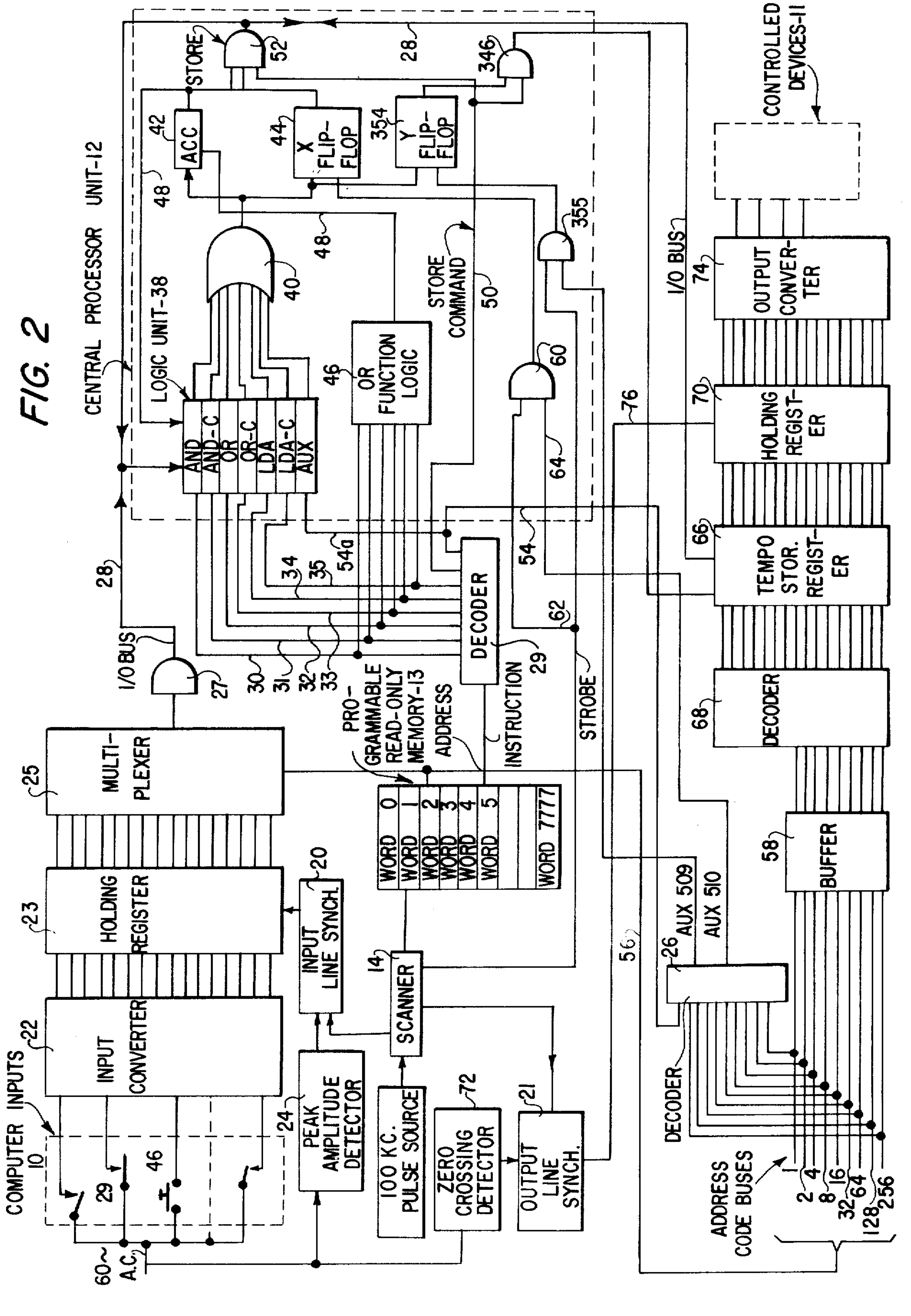
FIG. 2 is a more detailed block diagram of the invention.

Referring now to FIG. 2 which shows the process controller invention in block form but in greater detail than FIG. 1, it will be seen that the computer inputs 10 are represented by a plurality of contacts which may comprise normally open contacts, normally closed contacts, pushbuttons, etc. These are shown as receiving energy from a 60-cycle a.c. power source as this is what is most often encountered in actual practice.

The computer inputs 10 provide a plurality of inputs to an input converter 22, which may be of the type disclosed in U.S. Pat. No. 3,626,203, whose effect is to transform the inputs from high-level signals to low-level signals in the order of perhaps twelve volts d.c. Thus, each input of the input converter may selectively receive a 60-cycle 110 or 120 volt signal, and dependent upon whether or not it does receive such input, it will selectively produce at its output a 12 volt d.c. signal or no signal. It will further be understood that the various stages of the input converter, each corresponding to a respective input, at all times continuously follow the changing conditions of the inputs so that each stage of the input converter 22 is at each instant controlled in accordance with the condition of its associated input parameter.

The holding register 23 comprises a separate stage for each stage of the input converter, and each stage of the holding register may comprise a flip-flop which is operable to either of its two bistable states dependent upon the condition of the associated stage of the input converter. The various stages of the holding register, however, are not free to follow at each instant the operative condition of the associated stage of the input converter. Instead, the holding register is provided with an enabling input from the input line synch 20 at the beginning of each complete scan of the programmable read-only memory (ROM) 13. The input line synch 20 is controlled to provide its enabling input to holding register 23 at the instant of peak amplitude of the 60-cycle power source. Thus, the input line synch 20 of FIG. 2 is shown as receiving one enabling input from scanner 14, and another input is received from the peak amplitude detector 24. Thus, it is only after the end of the scan of memory 13 and at the instant when the 60-cycle source is at peak amplitude that holding register 23 assumes those conditions on its various stages which are at that precise instant representative of the input parameters, and the holding register then holds these conditions throughout the complete memory scan and until the beginning of the next scan. Consequently, the computations made by the apparatus of the invention are all dependent upon the particular conditions of the computer inputs 10 which they assume at a fixed instant of time preparatory to beginning a complete scan and are not subject to random change during a scan.

The memory 13 will subsequently be described in greater detail. For the present, it is sufficient to recognize that the memory is essentially a storage unit wherein there are stored a plurality of words each comprising a specific address and instruction. In a typical embodiment of the invention, the memory 13 contains 4096 words each comprising 12 binary digits, with 3 of the bits of each word being used to designate a specific instruction for the central processor unit (CPU) 12 and the remaining nine bits designating a particular address, i.e., a specific input or output register. As previously stated, the scanner 14 comprises essentially a ring-type counter, and the output of the scanner is applied to the ROM 13 so as to scan each word in the memory, one word at a time, starting with the word zero and proceeding in order through the word 7,777 which represents, in the octal number system, the last or 4,096th word in the memory, starting thereafter again with the "O" or first word, and so on.

As shown in FIG. 2, the address portion of each scanned word in applied both to multiplexer 25, which may be of the type described in FIG. 13–39 of "Pulse and Digital Circuits", pages 423–24; 1956, and to decoder 26. The purpose in applying the address portion of each word to the multiplexer 25 is to make it possible to select a particular stage of the multiplexer 25 which is to be operatively connected to AND gate 27 and thus to the input-output bus 28. An an example, assume that normally-closed contact 29 in the computer inputs 10 is associated with step No. 3 of the input converter 22 and thus also with stage 3 of holding register 23, and with stage 3 of multiplexer 25. If the address portion of a particular scanned word is intended to refer to this particular input, then the multi-bit address code will, when decoded, select only this particular stage 3 of multiplexer to be operationally connected to gate 27 and thence to input-output bus 28. In other words, the purpose in applying the address portion of the memory word to multiplexer 25 is to enable a designated one of the inputs to multiplexer 25 to at that time be operatively connected to the input-output bus while all other inputs and all output registers are at that time disconnected from the input-output bus.

The instruction portion of each scanned word is applied to decoder 29. According to the permutations of "1"s and "O"s in the three-bit instruction code, a selected one of the eight output leads from the decoder 29 is energized upon each scanned word of ROM 13. The first six and the eighth of these output leads 30–35 and 54*a* are connected to logic unit 38, and the particular one of these leads 30–35 and 54*a* which is selected determines which of the seven data processing functions of logic unit 38 is to be effective in response to the respective memory word. For example, if lead 30 is selected by decoder 29, the AND function of logic unit 38 will be effective; similarly, if the scanned word of ROM 13 results in the selection of lead 34 by decoder 29, the LDA ("load accumulator") function of logic unit 38 will then be effective.

From the preceding description, it can be seen that a particular word in ROM 13 may have an address portion which causes a particular data bit corresponding to a selected one of the computer inputs 10 to appear on input-output bus 28 and that, concurrently, the instruction part of the same word may enable a respective one of the data processing functions of logic unit 38. As a specific example, a particular word in ROM 13 when scanned will result in the appearance of a particular "O" or "1" data bit on bus 28 as a consequence of the fact that, at the beginning of the scanning cycle, front contact 29 of the computer inputs 10 was closed. If it is further assumed that the instruction part of the same scanned word corresponds to the LDA function, resulting in the selection of lead 34 by decoder 29, then the logic unit 38 will cause that particular data bit then on bus 28 to be applied as an input to OR gate 40. Since only the LDA function of logic unit 38 will now be effective, with all other functions of the logic unit at this time being ineffective, only this single input to OR gate 40 will appear at this time so that a corresponding data bit is then applied as an enabling input to both accumulator 42, to the X flip-flop 44 and to the Y flip-flop 354.

To continue with the preceding example, it will be assumed that the next succeeding word in ROM 13 has an address which results in the input-output bus 28 being selectively energized or de-energized in dependence on the condition of pushbutton 46 in computer inputs 10. If it is assumed that the instruction part of this same word represents the AND function of logic unit 38, resulting from the selection of lead 30 from decoder 29, then the particular data bit now appearing on the input-output bus 28 will be AND'ed with the data now being held in accumulator 42 and being fed back to logic unit 38 via bus 48. In a similar way, it can be appreciated by one skilled in the art that the logic unit 38 can selectively perform AND or OR functions, or the complement of each, and can also load into the accumulator any data bit appearing on the input-output bus (LDA), or can load into the accumulator 42 the complement of the data bit appearing on input/output bus 28 (LDA-C).

The computed result obtained by the logic unit 38 as described above is supplied as an input to OR gate 40; thus, the result of computation by any of the data processing portions of the logic unit 38 results in a single input to OR gate 40 and the application of an enabling input to accumulator 42, to X flip-flop 44 and to Y flip-flop 354.

If any of the first six listed data handling portions of logic unit 38 is effective, then a single input is applied to the OR function logic 46, with the result than an enabling input is then applied over lead 48 to accumulator 42. When so enabled, the accumulator 42 is capable of responding to the computed output of the logic unit 38 which is supplied to it from the OR gate 40, whereas the X flip-flop and Y flip-flop are not so enabled and thus cannot respond to the output of logic unit 38.

In addition to the six computing functions described above and comprising the AND or OR and load functions, together with their complements, two additional instructions may be provided by decoder 29. The first of these is a "store" command which may be selectively caused to appear on bus 50 and be connected as an enabling input to the store AND gate 52. When the "store" command is provided, it enables the AND gate 52 to provide a signal to the input/output bus 28 dependent upon the inputs then being received by the store gate 52 from both the accumulator 42 and the X flip-flop 44. Thus, if both the accumulator 42 and the flip-flop 44 are then storing a "1", then a "1" will be supplied to the input/output bus 28; whereas, if either the accumulator 42 or X flip-flop 44 is not storing a "1", then obviously a "O" will be supplied to the input/output bus 28. Thus, the data stored in the accumulator 42 is always "AND"ed with whatever is stored in the X flip-flop 44, and the reason for doing this will subsequently become clear when specific examples are given of the operation of the computer of this invention.

The store command, in addition to providing one input to gate 52, also provides an input to gate 346. The output from gate 346, the write signal, is coupled to the temporary storage register 66 and, when present, enables the temporary storage register 66 to receive signals from the input/output bus. When the write signal is not produced, the temporary storage register 66 is insensitive to data signals on the I/O bus.

A further instruction which may be provided by the decoder is what has been termed "AUX 510" function referring to the fact that the address "510" is designated aribitrarily as the address for the X flip-flop 44. Thus, when it is desired to store a data bit in the X flip-flop 44, it is only necessary to provide in ROM 13 a word having the address 510 and the instruction AUX.

When this is done, the instruction part of the word will be decoded by the decoder 29 so as to provide an appropriate signal on lead 54 which connects to an input to decoder 26. At the same time, the decoder 26 receives a plurality of inputs which are indicative of an address. More specifically, when the address part of the code appearing on lead 56 appears in the form of a selective energization of nine address buses which are connected to buffer 58. Connections are also made from these buses to decoder 26, and the manner of making these connections is such that this decoder 26 can provide an output signal when the word read from the ROM 13 has the address 510 and the AUX instruction. When these conditions are met, an input is provided for AND gate 60 over lead 64 from decoder 26. Concurrently, a strobe input over lead 62 from scanner 14 provides a second enabling input to AND gate 60. When both these inputs are received by AND gate 60, an enabling gate is applied to the X flip-flop 44. It will be noted that the enabling signal on lead 54*a* is also applied to logic unit 38 as an enabling input for the "AUX" data processing portion of this unit. Being so enabled, the "AUX" portion is capable of passing on to OR gate 40 the data bit then stored in accumulator 42 and fed back as an input to logic unit 38 over lead 48. Of course, at such time the accumulator 42 cannot be responsive to the computed output from logic unit 38 because it is not receiving an enabling input from the OR function logic 46.

When it is desired that any data bit appearing on the input/output bus 28 is to be stored in an output register, this is accomplished by providing the "store" command on lead 50 as previously described, which thereupon enables the store and gate 52 to provide a signal on the input/output bus 28. The address which is associated with the store command designates the particular one of the stages of the temporary storage register 66 which is then to be rendered responsive if write signal from gate 346 is present. This function is accomplished by the buffer 58 and decoder 68. The decoder 68 responds to the selective appearance of zeroes and ones on the plurality of buses carrying the bit address code and selecting the particular stage of the temporary storage register 66 which is then to be responsive to the particular bit then appearing on the input/output bus 28.

The various stages of the temporary storage register 66 may be continually responsive during a complete scanning cycle to the inputs that they receive from the input/output bus 28 and are thus capable of changing their conditions throughout a complete memory scan. This is permissible with the controller of this invention since the various stages of the holding register 70 which actually operate the controlled devices are not operated until the end of the complete scanning cycle. The various stages of the Holding Register 70 control corrsponding stages of Output Converter 74 which then in turn controls the various Controlled Devices 11. The function of the Output Converter 74, which may be of the type described in U.S. Pat. No. 3,633,950, is to respond to the low level of signal which is provided by the Holding Register 70 and to convert such signal to a voltage and power level which is suitable for the control of the various Controlled Devices 11. The holding register 70 maintains its various stages in the conditions to which they were operated at the completion of the last scan. It is not until a scan of the memory has been completed that the output line synch 21 provides an enabling input to holding register 70 over lead 76 to thereby permit its various stages to assume conditions corresponding to those of the associated respective stages of the temporary storage register 66. As previously described in connection with FIG. 1, the output line synch is so controlled that it provides an output pulse to holding register 70 only upon its detection of the zero crossing point of the waveform of the power source. Thus, the output line synch 21 is controlled jointly by scanner 14 which senses when a memory scan has been completed and also by the zero crossing detector 72 which recognizes the instant of zero amplitude of the 60-cycle waveform. In this way, each stage of (1) AND, (2) AND-C, (3) OR, (4) OR-C, (5) LDA; (6) LDA-C, (7) STO, and (8) AUX may be issued commands. These commands perform, respectively, the following functions: (1) "AND" the bit stored in the accumulator with the bit on the bus and place the result back in the accumulator, (2) "AND-C" the bit stored in the accumulator with the complement of the bit on the bus and store the result in the accumulator, (3) "OR" the bit stored in the accumulator with the bit on the bus and place the result in the accumulator, (4) "OR" the bit in the accumulator with the complement of the bit of the bus and place the result in the accumulator, (5) place the bit on the bus in the accumulator, (6) place the complement of the bit on the bus in the accumulator, (7) "AND" the bit in the accumulator with the bit in the X flip-flop 44, and store the result in a register indicated by the address portion of the instruction, (8) "AUX" is an auxiliary instruction which can be used for a variety of purposes, in the present embodiment it is used with the address 510 at which time the contents of the accumulator are transferred to the X register 44, and with the address 509 to transfer the contents of the accumulator to the Y register 354.

The first output line from decoder 29, corresponding to the AND instruction, is connected as one input to the gate 302. In additon, through inverter 306 it is also connected to gate 332. The second line, corresponding to the AND-C instruction, is also connected as one input to gate 302 and, from inverter 307, is connected to gate 333. The third line, corresponding to the OR instruction, is also connected as one input to gate 302 and is, in turn, connected through inverter 308 to gate 334. The fourth line, corresponding to the OR-C instruction, is connected as one input to gate 302 and, through inverter 309, is connected to gate 335. The fifth line, corresponding to the LDA instruction, is connected as one input to gate 302 and, through inverter 310, is connected to gate 336. The sixth line, corresponding to the LDA-C instruction, provides one input to gate 302 and, through inverter 311, provides an input signal to gate 337. The seventh line, corresponding to the store instruction, provides an input, through inverter 304 to gate 345 and inverter 346. The eighth line, corresponding to the AUX instruction, provides an input, through inverter 305 to gates 352, 353, and 338.

The ROM 13, in addition to providing the three bits corresponding to the instruction portion of the word stored at any location, supplies nine bits corresponding to the particular address associated with that instruction. One location at which the address information is utilized is the CPU. Address bits $A_1$ through $A_{256}$ provide inputs to decoder 351.

At the inputs of the CPU, $A_1$–$A_{256}$ appear in negative logic, that is, normally all the input lines are high and only when a particular line is selected does its voltage go low. For example, in negative logic, for the address 510, all inputs would be low except $A_1$. Decoder 351 provides an output signal to gate 353 if address 509 is decoded and an output signal to gate 353 if address 510 is decoded.

Each of the registers 42, 44, and 354 is provided with three inputs and two outputs. Two of the inputs to each of the registers, *a* and *b*, provide push-pull inputs, that is due to inverter 342 the input at *b* is the complement of the input at *a*. A third input, *c*, provides an inhibiting input, that is, an input signal at *c* will disable the register from responding to the inputs received at *a* and *b*. The output at *d* reflects the contents of the register and the output at *e* reflects the complement of the contents of the register.

The AND signal from decoder 29 provides one input to AND gate 332, through inverter 306. A second input to gate 332 is provided by the contents of register 42 through the *d* output, and the third input to gate 332 is provided by the input/output bus 28. At this point it should be explained that the data on the input/output bus 28 exists in negative logic only and therefore to obtain the bus signal in positive logic it is necessary to process this signal through an inverter. Therefore, an input to gate 332 is provided by inverter 331.

One input to gate 333 in the AND-C signal applied through inverter 307 from decoder 29. A second input to gate 333 is the contents of the register 42 provided through the *d* output. The third input to gate 333 is the output of inverter 330 which is fed by inverter 331. The net result of the two inverters is transmission of the input/output bus signal, complemented.

The OR gate 334 receives one of its inputs from gate 328. Gate 328 is provided, on one input, with the complement of the contents of register 42 through its *e* output. The other input to gate 328 is provided by inverter 330 which, as is explained above, provides the complement of the input/output bus signal.

The OR-C gate 335 receives one input from gate 329. Gate 329 is provided with the complement of the contents of register 42 through its output *e*. The other input to gate 329 is provided by inverter 331. The output of gate 329 forms one input for gate 335 whose other input is the OR-C signal provided through inverter 309.

The LDA signal, through inverter 310, forms one input to gate 336. The other input to gate 336 is obtained from the output of inverter 331.

The LDA-C signal, through inverter 331, forms one input for gate 337. The other input to gate 337 is provided by inverter 330.

One input to gate 338 is provided by inverter 305 which is fed by decoder 29. The second input to gate 338 is the contents of the register 42 provided through its *d* output.

One input to gate 339 is the output of gate 302, and the remaining input to gate 339 is a strobe signal provided from the scanner 14 through inverter 312.

An input to gate 340 is the output of inverter 327 which is fed by gate 303. The other input to gate 340 is the same strobe signal from the inverter 312.

Gate 353 provides one input to gate 355, through inverter 356, the other input to gate 355 is the strobe signal S. The store command provides one input to write gate 346, the other input to gate 346 comes from Y gate, 354.

Gates 332–338 have their outputs tied in common to inverter 341. Inverter 341 provides the *a* input signal for registers 42, 44, and 354 Inverter 342, which is fed by inverter 341, provides the *b* input to registers 42, 44, and 354. Gate 339 provides the *c* input for register 42, gate 340 provides the *c* input for register 44, and gate 355 provides the *c* input for register 354. Gate 345 is fed, along with the store signal, through inverter 304, with the *d* outputs of registers 42 and 44. The output of gate 345 provides the input/output bus signal in negative logic. Also provided at the outputs of the CPU are the complement of the contents of registers 42, 44, and 354 through their respective *e* outputs. The output of inverter 346 also provides a "write" signal in negative logic.

Register 42 forms the accumulator of the CPU in that, during a computation, the subtotal is stored therein. Register 42 comprises a flip-flop which provides ample storage for the single bit computational output which is the maximum amount of data provided on any word of the memory scan. In a similar manner, registers 44 and 354 are also flip-flops which provide adequate storage for the single bit which will be required to be placed in each.

Before describing the various operations of the CPU, it should be noted that the same input signals are provided both registers 42, 44, and 354 on their *a* and *b* inputs. The inhibit input signal, *c*, is provided to differentiate between those signals which are required to be stored in the accumulator and those signals which are required to be stored in the X or Y registers, 44 and 354, respectively. Any of the first six instructions, that is, AND, AND-C OR, OR-C LDA, or LDA-C require the outputs of inverters 341 and 342 to be stored in the accumulator and not to be stored in the X and Y registers, 44 and 354. If any of these six signals present present, the gate 302 will not be enabled, providing a high output of gate 339 which will provide a low input to the *c* input of accumulator 42. Thus, if any of the six input signals are present, the accumulator 42 will not be inhibited and it will accept any signal presented to it. At the same time, neither gates 352 nor 353 will be enabled. This is true since these gates will only be enabled in response to an AUX instruction. Therefore, the output of these gates will be high, the output of inverters 356 and 357 will be low, and the output of gates 340 and 355 will be high, thus inhibiting the X register 44 and Y register 354. Therefore, regardless of the signals provided by inverters 341 and 342 during an AND, AND-C, OR, OR-C, LDA, and LDA-C instruction the X register 44 and Y register 354 will not respond. The only time the *c* input of register 44 or 354 will be low is when an AUX 509 or 510 instruction is presented driving either the output of gate 352 and 353 low providing a high input out of inverter 356 and 357 and a corresponding low output from gate 340 and 355. If the instruction is a store or an AUX instructiton, gate 302 will provide a low input to gate 339 which will provide a high input to accumulator 42 thus inhibiting it from responding to any signals on inverters 341 and 342. Thus, during these two, store or AUX, instructions the accumulator, register 42, will not respond to input signals. A corollary of this operation is that during a store instruction, when a data bit is written into an output register, the accumulator remains unchanged and therefore its contents can be used in a subsequent operation. The strobe input, *s*, through inverter 312 provides one of the high inputs necessary to either gate 339, gate 355, or gate 340 to allow one of the registers 42, 44, or 354 to respond to input signals. Therefore, only during the occurrence of the strobe signal can data be written into registers 42, 44, or 354.

Of the different operations performed by the CPU, the most straight forward and easiest to understand are the AND, AND-C, LDA, and LDA-C instructions. Each of these operations is performed, in essence, by a single separate gate. The gate 332 performs the AND function, gate 333 performs the AND-C function, gate 336 provides the LDA or load funciton, and gate 337 provides the LDA-C function, i.e., loading the complement of the data on the bus into accumulator 42. In each case, the decoded instruction signal from decoder 29 is fed to the respective gate. Another input to these gates is the input/output bus signal or its complement depending upon whether or not the gate is providing a complement function. The bus signal which occurs in negative logic is provided in positive logic by inverter 331, and the complement of the bus signal is provided by inverter 330. The AND gate 332 receives the decoded AND signal as one input, it receives the *d* output of the register 42 as another input, and it also receives the signal on the input/output bus, in positive logic. If an AND signal is present, gate 332 provides a low output if the input/output bus is high and if the accumulator had stored a 1. This low output, inverted by inverter 341, is provided as an input to the register 42. At this time, the *c* input to the register 42 would be low as explained above and a 1 would be written back into register 42. If either the signal on the input/output bus were low or the register had previously stored a 0, a 0 would be rewritten back into the register. Thus it can be seen that the central processing unit has performed an AND function on the data previously stored in accumulator 42 with the data on the input/output bus.

The AND-C gate 333 performms the same function, the only difference being that its input is from inverter 330 providing the complement of the bus signal. Therefore a 1 will be rewritten into accumulator 42 if the contents previously stored therein were high and the signal on the input/output bus were low. This is obviously an AND function between the accumulator contents and the complement of the signal on the bus.

Gate 336, when enabled by a LDA, or load instruction, will place in the accumulator the signal on the input/output has through inverter 331. If the signal on the input/output bus were high, a 1 would be written into the accumulator. Correspondingly, if the signal on the input/output bus were low, a 0 would be written into the accumulator. The previous contents of the accumulator are immaterial to this operation. In a like manner, the gate 337 performs a load complement or LDA-C instruction. When energized by this instruction signal, it will place in the accumulator 42 the complement of the signal on the input/output bus. In order to perform this function, its input is from inverter 330 which provides gate 337 with a signal corresponding to the complement of the signal on the input/output bus. As has been mentioned previously, if any of these four input instructions are present, the *c* input to the accumulator will be low during the occurrrence of the strobe signal from scanner 14, thus allowing the accumulator 42 to respond to the outputs of inverters 341 and 342 at the proper time.

The OR and OR-C functions are provided using only NAND gates. The OR function is provided by gates 328 and 334 and the OR-C function is provided by gates 329 and 335. Gates 328 and 329 both receive, as one input signal, a signal representing the contents of the accumulator 42. Gate 328 receives as its other signal the complement of the contents of the bus and gate 329 receives as its other input signal the bus signal. A truth table for the function A or B (where A indicates the contents of the accumulator and B indicates the bus signal on the bus) is reproduced below.

| A / B | 1 | 0 |
|---|---|---|
| 1 | 1 | 1 |
| 0 | 1 | 0 |

Thus, if either the accumulator is storing a 1 or the bus has a 1 thereon, the function A or B will produce a 1. If, and only if, both the accumulator and the bus have a 0 will a 0 be the result of the function A or B. To determine whether or not the combination of gates 328 and 334 provide the OR function as shown in the table above, it is necessary to examine the condition which will produce a 0 input to the accumulator 42, assuming an OR instruction is present. This condition should only occur if the original contents of the accumulator 42 is 0 and the signal on the bus were also 0. A low input at accumulator 42 is generated by a high input to inverter 341 which can only occur, assuming an OR instruction present, if the other input to gate 334 is low. This corresponds to gate 328 being enabled. Since gate 328 is provided with a signal corresponding to the complement of the accumulator contents and also a signal corresponding to the complement of the bus siganl, this gate will be enabled, that is, both its inputs will be high when the accumulator is storing a 0 and the bus signal is a 0. Under these circumstances, the complement of the accumulator contents will be a 1 and the complement of the bus signal will be a 1, enabling gate 328. So a low output is provided the accumulator 42 when both the accumulator and the bus signal are 0. This checks with the truth table above. For any other condition, that is, if the accumulator had a 1 therein or the bus signal is high, the gate 328 would not be enabled and therefore would produce a high output signal which would cause a 1 input to the accumulator 42. The foregoing demonstrates that the combination of gates 328 and 334 do in fact mechanize the OR truth table reproduced above.

Gates 329 and 335 perform an OR-C function, that is, they combine the contents of the accumulator and the complement of the contents of the bus to produce the result A or B. The truth table for this function would be the same as the one reproduced above, substituting B for B. Now let us see if the combination of gates 329 and 335 will produce this function, assuming the instruction OR-C is present. Examining the truth table we determine that the only time a 0 will be produced by this function is when the accumulator contents are 0 and the bus complement is 0, corresponding to a 1 on the bus. Under these circumstances, gate 329 will be enabled. If the accumulator contents are 0, then the complement of that will be a 1. The other input to gate 329 is the bus signal in true form. That signal will also be high when a 1 is on the bus. Therefore, the output of gate 329 will be low providing a high output from gate 335 which provides a low input to the accumulator 42 through inverter 341. Therefore, the first condition of our truth table is vertified. When the accumulator has a 0 and the complement of the bus is a 0, the combination of gates 329 and 335 will also produce a 0. If either of these conditions is changed, if the accumulator stores a 1 or the bus signal is a 0 gate 329 will not be enabled producing a high output as an input to gate 335 which will cause a 1 to be presented to the accumulator 42. This verifies the remaining three possibilities and the entire truth table is verified.

Figure 3:
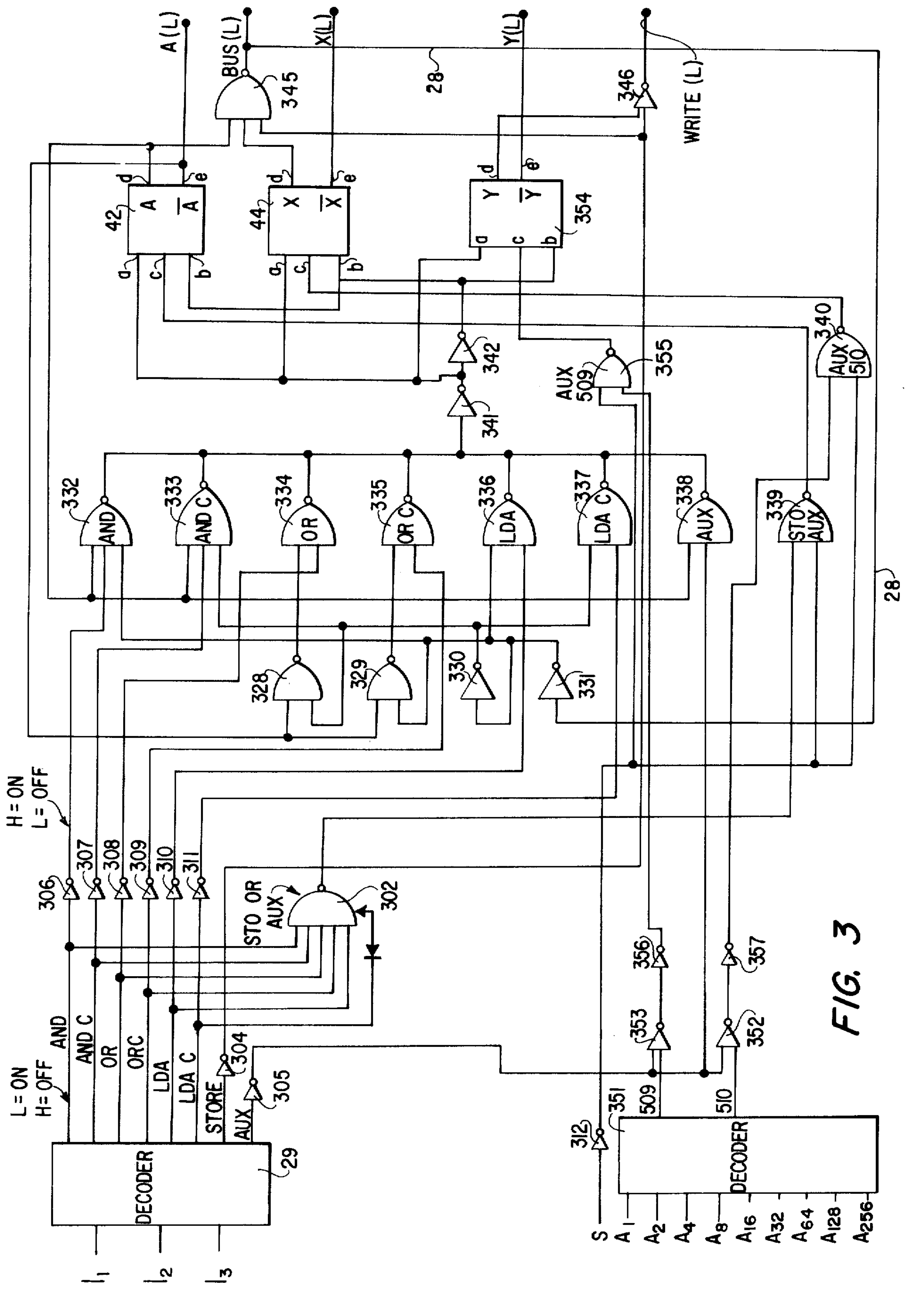
FIG. 3 is a circuit diagram of the central processing unit of the controller of this invention.

In order for the computed result to be effective, it must be transferred from the CPU to one of the output registers by the input/output bus. The only path to this bus from the CPU is through the gate 345. As has been explained above, one of the inputs to gate 345 is the store signal from decoder 29 via inverter 304. The other two inputs are provided by the contents or registers 42 and 44. It will thus be noted that before any information is transferred via gate 345, the function A AND X (where X stands for the contents of register 44) is performed. Clearly then, it must be possible to place data into register 44 for the organization depicted in FIG. 3 to be effective at all. If register 44 contains, at all times, a 0, then no 1's will ever be written out of the CPU regardless of the contents of the accumulator 42. Prior to describing the store instruction, we will now illustrate how data may be written into the X register 44.

The eighth instruction, AUX, is provided via inverter 305 to gate 388. Thus when AUX is the instruction inverter 305 will provide a high input to gate 338. The other input to gate 338 comes from the accumulator 42 in its true form. when the instruction AUX 510 is detected, gate 352 will be enabled to enable gate 340 to remove the inhibiting input from X register 44. Therefore, if a 1 had been stored in the accumulator, when an AUX 510 instruction is received, a high input will be provided to registers 42, 44, and 354 by inveter 341. As has been discussed above, if none of the instructions AND, AND-C, OR, OR-C, LDA, or LDA-C is present, the accumulator 42 will be inhibited from responding to input signals via gate 339. If AUX 509 is not decoded then register 354 will be inhibited. It has also been shown above that when the AUX 510 instruction is read, gate 340 provides a low input to the *c* input of register 44 and thus enbles it to respond to input signals. Therefore, during an AUX 510 execution, a 1 will be written into the register 44 if a 1 was stored in accumulator 42. Correspondingly, a 0 will be written into register 44 if a 0 had been stored in accumulator 42. By reason of the action of gate 339 and 355 inhibiting the inputs to registers 42 and 354, the contents of these registers will remain unchanged.

A further condition for the effectiveness of the computer result is that it must be received in the temporary storage register 66 (of FIG. 2). As has been explained above, the write signal, produced by gate 346 (in FIGS. 2 and 3), enables the data signal on the bus to be received by the temporary storage register 66. The write signal is produced by gate 346 upon the occurrence of a store signal when the Y register 354 has a 1 stored therein. Therefore, a further prerequisite to information reaching the temporary storage register 66, is that the Y register has a 1 stored therein. If not, regardless of the action of gate 345 in providing date to the input/output bus, the data will not be effectively received at the temporary storage register 66. Accordingly, we will now demonstrate how a 1 can be written into the Y register or, conversely, a 0 written therein to inhibit transfer of information from the input/output bus to the temporary storage register 66.

The eighth instruction, AUX, is provided via inverter 305 to gate 353. A further input to gate 353 is provided by decoder 351 when address 509 is decoded. If the instruction read out of ROM 13 corresponds to AUX 509, then gate 353 will be enabled, as discussed above, providing a high input to gate 355. The other input to gate 355 is provided by the strobe signal. Thus, when an AUX 509 instruction is decoded the Y register is uninhibited and allowed to respond to its input signals provided by inverters 341 and 342. As explained above gate 338 responds to the AUX instruction to provide at the output of inverter 341 with the data bit stored in the accumulator. Therefore, if 1 had been stored in the accumulator when an AUX 509 instruction is received, a high input will be provided to register 42, 44, and 354 by inverter 341. As has been discussed above, if none of the instructions AND, AND-C, OR, OR-C, LDA, or LDA-C is present, the accumulator 42 will be inhibited from responding to input signals via gate 339. Similarly, if AUX 510 is not decoded then gate 352 will not be enabled providing a high output signal from gate 340 to inhibit the X register, 44. Therefore, during an AUX 509 execution, a 1 will be written into the register 354 if a 1 had been stored in the accumulator 42. Correspondingly, a zero will be written into register 354 if a zero had been stored in accumulator 42. By reason of the action of gates 339 and 340 inhibiting the inputs to registers 42 and 44, the contents of these registers will remain unchanged. When the Y register 354 contains a 1, then any strobe signal will produce a write signal so any output on the I/O bus will be effectively received at a temporary storage register 66.

Now that the method of writting into register 44 and 354 has been described, the operation of the store instruction will also be described. When a store instruction is received, gate 302 will be enabled, providing a low output signal to gate 339 inasmuch as none of the signals AND, AND-C, OR, OR-C, LDA, or LDA-C will be present. The low input to gate 339 provides a high input to accumulator 42 thus inhibiting it from receiving any further signals. The contents of accumulator 42 will thus remain unchanged. In addition, inasmuch as the instruction AUX 510 is not present, the output of gate 352 will be high, providing a low input to gate 340 which will provide a high input to X register 44 thus inhibiting this register from changing its contents. In a like manner, since AUX 509 is not present, gate 353 will produce a high output to inhibit the Y register 354 from responding to its inputs. The store signal is also provided to gate 345 as one input thereof. The other two inputs ae received from accumulator 42 and register 44, in true form. Therefore, if both registers are storing a 1, gate 345 will be enabled providing a low output signal which will be placed on the input/output bus. Inasmuch as the bus is in negative logic or complement form, the 0 indicates a 1. The same memory location at which the instruction store was located will also contain an address. This address, when decoded, will elect a particular output register. If we assume the Y register 354 is storing a 1, a write signal will be produced to enable the selected output register to respond. Thus, as has been stated above, whenever a store instruction is written, an unprogrammed A AND AUX nsturction is performed.

DETAILED DESCRIPTION OF THE READ ONLY MEMORY

Figure 4:
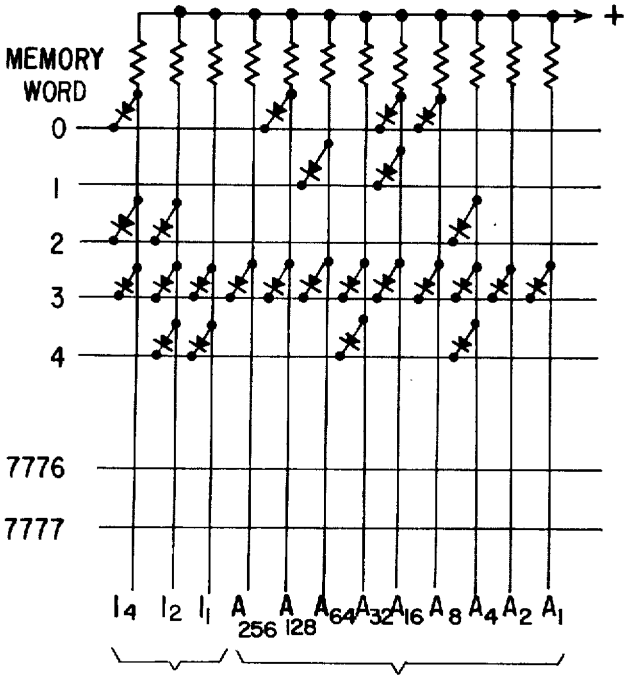
FIG. 4 illustrates diagrammatically a portion of the read-only memory of the invention.

The read only memory comprises an interchangeable printed circuit card with a matrix diode array as shown in FIG. 4. The memory provides a maximum of 4,096 words, each with 12 bits. The words are subdivided into two portions, an instruction portion with 3 bits, and an address portion with 9 bits. The scanner unit 14 sequentially interrogates the memory and the instruction and address portions of the word stored at each location are read out in turn. The memory word inputs, at the left, 0-7777, is intended to illustrate the input to the memory from the scanner. A DC potential is applied to the vertically oriented wires through appropriate resistances. The vertically oriented wires are selectively interconnected to the horizontally oriented wires by a diode-fuse combination. As originally supplied, a diode-fuse combination is located at each intersection of the array. The memory is written into by selectively open circuiting the fuse-diode combinations at selected locations. Of course, once a fuse-diode combination is open circuited, it cannot be replaced and therefore the only changes that can be made, once a word has been written in at a selected location, is to open circuit some or all of the remaining fuse-diode combinations in that particular location.

In the present invention, the scanner selects a memory location by driving the correspondong horizontal wire to ground. Whereas, previously, each of the vertically oriented wires exhibited a plus potential, corresponding to the power source, when a memory location is interrogated by grounding those vertically oriented wires where the fuse-diode combination is intact, will also be driven near ground while the remaining vertically oriented wires will remain at the power source potential. Thus, in the example shown in FIG. 3, when memory location 0 is interrogated, the ROM output will be in the configuration 011101100111, where a 1 indicates a high potential and a 0 a low potential. In the controller of the instant invention, the memory read out is considered to be in negative logic and therefore the positive logic equivalent of the foregoing configuration would 100010011000. When broken down into its instructions and address portions, this corresponds to an instruction of 100, or an octal 4 corresponding to a load (LDA). The address portion of this instruction corresponds to 010011000 or octal 230 (decimal 152). In a like manner, memory location 1 contains the instruction 000 which corresponds to the AND instruction. The address portion of this memory location reads 001010000 corresponding to address 120 (octal). The next memory location has the instruction corresponding to 110000000100. Interpreted, the instruction portion of this word is an octal 6, corresponding to a store instruction the address portion of this instruction word is a 4. Therefore, the first three memory locations contain the following program.

LDA 230
AND 120
STO 4

The fourth memory location, memory word number 3, contains a series of 1's. This corresponds to the instruction AUX and the memory location 511. This is a no operation instruction inasmuch as CPU will not respond to it. Thus, it is possible to leave unwritten memory locations for additional expansion at a later time. These locations will cause no operation of the controller and the machine will go on to the next memory location in order. Thus, if a program does not fill a ROM unit, the remaining memory locations can be left untouched and the controller will proceed through them causing no operation.

Mention has already been made of the fact that it is usually not possible to rewrite in this memory once data has been inserted at a particular memory location. However, it is possible to open circuit the remaining diode-fuse combinations for that memory location. Thus, in case of an error in writing or in a situation where it is desired to expand a previous instruction repertoire, it is only necessary to open circuit the remaining diode-fuse combinations in any memory location. This will result in an instruction of 000, interpreted as an AND instruction, coupled with the address 0. Location 0 is permanently wired to the power source so that this operation corresponds to an AND 1. Those skilled in the art will readily understand that ANDing anything with a 1 will result in what had previously been present and therefore this is another type of "no instruction" operation.

DETAILED DESCRIPTION OF FIG. 5

Figure 5:
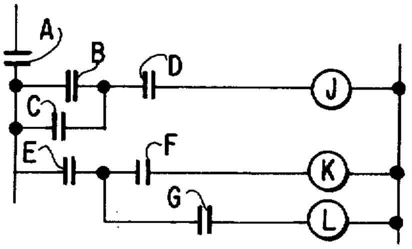
FIG. 5 illustrates some of the typical process control computations which may be made by the controller of the invention.

Now that the structure of the controller has been described in detail and the operation of its component parts has also been described, a few examples will show the manner in which control problems can be solved using the controller of the instant invention. FIG. 5 illustrates a simple, but convenient control problem that can be solved using the controller of the instant invention. The reference characters A through G represent normally open switches which are connected as inputs to the controller of the instant invention. The problem is for the controller to properly energize loads J, K, and L, or any of them, when the input conditions A through G are proper for that particular load or loads to be energized. For instance, if inputs A, B, and D are closed, load J should be energized or if inputs A, C and D are closed, load J should also be energized.

Figures 6, 7, 8:
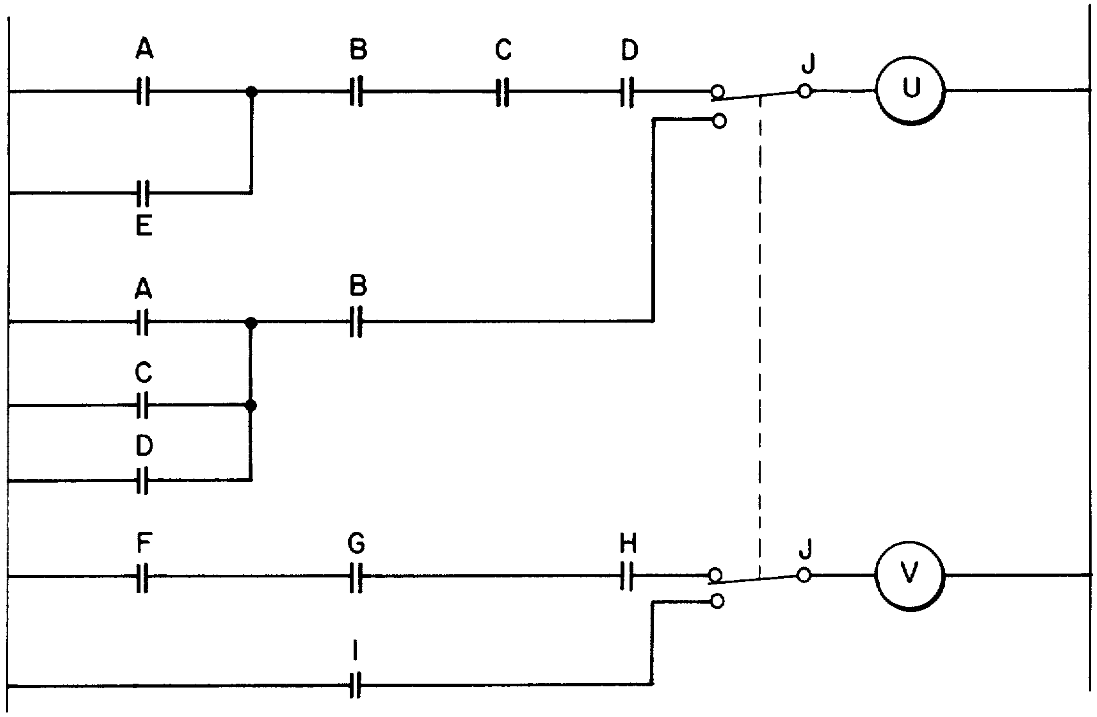
FIG. 6 illustrates a typical program for the computer of the invention which program is particularly related to the problem of FIG. 5.
FIG. 7 illustrates a typical control problem, the solution of which may use the jump instruction.
FIG. 8 illustrates a program including effective and ineffective jump instructions to solve the problem of FIG. 6.

A program for performing this operation is illustrated in FIG. 6. This is not the most effective program to solve this particular control problem but it is one which illustrates some of the features of the controller described in the instant application. For the following description, we will assume that the reference characters A through G are identified and connected to numerical input register locations and the loads J, K, and L are identified and connected to particular output registers. Once the program such as that shown in FIG. 6 has been written, it is only necessary to selectively open particular diode-fuse combinations on the ROM, as discussed with respect to FIG. 4, to reflect this particular program. The program is written in machine code in the second column of FIG. 6 except for the alphabetic designations A–L. It should be understood that these would be substituted with numeric identifications related to the registers the particular inputs or outputs denoted by the letters A–L are connected to.

The program illustrated in FIG. 6 is not designed to illustrate the use of jump instruction, but is merely designed to illustrate a program which is capable to solving the control problem shown in FIG. 5. Therefore, the first two instructions are merely to place a 1 into the Y register 354 so that it will allow normal processing to proceed. As has been explained above, a 1 in this register is necessary to allow computed data to reach the output registers. The first instruction LDA 000 merely directs the central processor to have loaded in its accumulator the data at location 000. This location is permanently wired to the power supply and therefore instruction 1 will cause a 1 to be written into accumulator 42. The second instruction, AUX 509, is a transfer of the contents in the accumulator to the Y register 354 as has been explained above. The code form corresponding to AUX 509 is shown in the column at the right in FIG. 6.

The next two instructions are merely to place the condition of the master switch A into the X register 44. This is done inasmuch as the condition of this controls the entire control problem. If a particular control setup has a number of switches of the type represented by the switch A, different instructions, similar to the first two instructions shown in FIG. 5, could be inserted at appropriate locations in the program to load the X register 44 with the appropriate data.

The next three instructions, 5–7, compute the control problem to determine whether the load J should or should not be energized. In particular, the condition of the switch B is loaded into the accumulator, register 42, by the fifth instruction. The sixth instruction is an OR function, combining the state of the switch B with the state of the switch C and placing the result in the accumulator register 42. The seventh instruction ANDs the subtotal with the condition of the switch D and places the final total in the accumulator register 42. The next instruction, 10 (octal), transfers the computed results out to the output register associated with load J. Instruction 11 then begins to compute the control problems associated with loads K and L.

The particular program shown in FIG. 6 illustrates a significant feature of the controller of the instant invention when using the type of memory illustrated in FIG. 4. The reader will note that the instruction 12 performs the AND function with the input conditions for inputs E and M. It will be apparent that there is no input M associated with the logic problem shown in FIG. 5. As a consequence, the instruction number 13, store K will certainly be erroneous. Either there is no input M or the input M should have no effect on the load K. These two instructions merely illustrate that, using the present invention, if an incorrect program is written into a memory card, it is not necessary to discard that card. Inasmuch as the output loads are only activated once a complete memory scan has occurred, loading the K register with incorrect data will not have any effect until a complete memory scan has been made. Therefore, to correct this error, it is only necessary to rewrite, in succeeding memory locations, the correct program for computing the result to be placed in the K register.

Instructions 14 through 16 properly compute the result for the K register. Therefore, although incorrect data will be written into the K register by instruction 13, subsequent instruction 16 will correct this result.

The control problem illustrated in FIG. 7 will be utilized to illustrate the uses of the jump instruction. In FIG. 7 a number of contacts, A through I, and the contacts J determine whether or not loads U and V should be energized. Depending upon the condition of the J contacts, the loads U and V should be energized under different circumstances. Thus, for instance, if the J contact is in its upper position, then the load U should only be energized when all of contacts B, C, and D are closed and either contact A or contact E is closed. On the other hand, if J is in the lower position, then the load U may be energized if contact B is closed and any one of contacts A, C, or D is also closed. In a like manner, as shown in FIG. 7, if the contact J is in its upper position, then load V should be energized if all of contacts F, G, and H are closed. However, if contact J is in its lower position, then V is energized when contact I is closed. By now it should be apparent that this control problem could be solved with the controller disclosed in this application without utilizing the jump instruction. However, the program to solve this problem can be considerably shortened if a jump instruction is available. The program shown in FIG. 8 is a suitable program for solving this particular control problem using the jump instruction. As has been the case with the control problem and program in FIGS. 5 and 6, input and output designations are shown with letters, in this case letters A throught J, U and V. In actual practice, these different inputs and outputs would be replaced by numeric designations.

The first instruction in the program is to load the accumulator with the data at location zero. By reason of the fact that location zero is permanently wired to the power supply, a 1 will be entered into accumulator 42 by reason of this instruction. Instruction 2 is an AUX 510, which loads the X register 44 with the 1 that had been previously put in the accumulator. Absent this instruction, none of the computed data could pass through gate 345 to the input/output bus and therefore none of the program would be effective at all. Now that the X gate 44 is loaded with a 1 by reason of instruction number 2, gate 345 will respond to its inputs from the accumulator to place data on the input/output bus. The third instruction loads the accumulator with the condition of the contact J. The fourth instruction is the jump instruction, AUX 509, which now loads the Y gate with the condition of the contacts J. Assuming that the upper contact being closed is chosen at the true or 1 convention, then in the condition shown in FIG. 7, after the execution of instruction number 4, the Y register would have a 1 stored therein to indicate an ineffective jump. The fifth instruction loads the accumulator with the condition of the contacts A which is ORed with the condition of the contact E and then steps 7 through 11 AND the result with the condition of contacts B, C, and D. The twelveth instruction is to store the result at temporary output register U. Since we have assumed that the contact J being in the condition shown in a true or 1 condition, then the twelveth instruction will place data on the input/output bus and this data will be received at the U temporary storage register. The instructions 13 through 16 in a like manner compute the condition of the V storage register.

Instruction 17 loads the accumulator with the complement of the input at J which, in this instance, would be a zero. Instruction 20 is the AUX 509 or jump instruction which would now load the Y register with the zero. As a result, although program steps 21 through 27 will be executed, in the sense that data will be transferred from the input/output bus to the accumulator and the respective OR and AND operations will occur as programmed, none of the data placed on the input/output bus from the accumulator 42 will be effective to reach the temporary storage register U and V inasmuch as the write signal will not be produced.

Had the J contacts been in the lower or zero position, then the Y register would have been loaded with a zero by instruction 4. As a result, the output data computed by instructions 5 through 16 would have been unable to each the output registers and in the case these instructions would be jumped.

As can be seen above, the fixed program shown in FIG. 8 comprises two portions which are alternately effective. That is, depending upon the condition of the J contacts, either instructions 5 through 16 will be effective or steps 21 through 27 will be effective, and in no case will both be effective. The fixed program shown in FIG. 8 then responds to the variable data as represented by contact J to execute one or the other of the portions of this program.

Although in the example shown in FIG. 7 the outputs U and V were involved regardless of the condition of the contacts J, this is certainly not a requirement for this program. In other words, the jump instruction can choose not only between different computations to be performed but it can also choose between different outputs to be responsive. That is, under one set of circumstances a program portion will control the state of one output, and if a different program portion is chosen by the jump instruction, then this same, or different, computation can control a different load.

It should be readily apparent that the X register 44 cannot be used to accomplish a similar function. During the entire portion of the program during which the X register 44 has a zero, each of the outputs which are addressed will receive a zero. In contrast, during the execution of a portion of a program during which the Y register contains a zero, the outputs involved will be unaffected by the computation and thus left in their previous state. Thus, mere duplication of the X register would not be effective to accomplish the same function as the jump instruction which is accomplished by the Y register.

Various modifications may be made to the controller of this invention to fulfill specific requirements. As one example, it is to be expected that any specific application of the controller will use less than the full capacity of the read-only memory. Where this occurs, it is possible to have the scanner 14 simply scan through the remaining unused memory words, thereby returning eventually to word zero again of the memory so as to start a new memory scan. However, it is also possible to operatively connect the word to the memory which immediately follows the last-used memory word to provide a re-setting input to scanner 14 which will force the scanner 14 back to the beginning of its count so that a new scan of the memory 13 will be initiated. Such a reset of connection is shown diagrammatically in FIG. 2 by the dotted line connection 63.

The detailed description of the invention presented herein has described only two auxiliary functions, AUX 510 and AUX 509 functions. Other auxiliary functions can be added by simply providing an additional gate for each such desired auxiliary function. It is thus possible, for example, to provide an AUX 508 function, in response to which an operative connection is then made from the computer apparatus shown in block form in FIG. 2 to auxiliary computing apparatus such as an exclusive OR, or the external timer, shift register, etc.

What is claimed is:

1. In a process control computer capable of executing a jump instruction, program storage means, including a read-only memory for storing a sequence of instructions which may include a jump instruction, instruction decoding means having an input fed by said memory, input means, output means, and devices controlled by said output means, the improvement compirsing:

central processor means to execute said decoded instructions in sequence and which in response to a jump instruction may inhibit the output means from responding to data signals without impairing the response of the central processor to other instructions, said central processor means comprising a. accumulator means which, in response to instructions from said instruction decoding means, feeds control signals to said output means, b. logic means which receives to be processed from said input means, and also receives decoded instructions from said instruction decoding means, for carrying out the logical operations specified by said instructions and placing data signals in said accumulator means, c. first gate means for providing a signal in response to a jump instruction, d. and control means comprising an auxiliary register having two states, and register setting means responsive to data signals from said accumulator means and to said signal from said first gate means for placing the register in one of said states, and second gate means controlled by said register to inhibit the output means from responding to said control signals and to inhibit the output means for modifying the existing controlling effect it has upon said devices during the period when said register is in said one state.

2. In a process control system according to claim 1, means responsive to a given instruction for delivering a data signal from said accumulator means to said output means, said second gate means having two inputs respectively responsive to said given instruction and to the state of said register.

3. In a process control system according to claim 2, timing means for controlling the read-out time of said memory and for providing timing signals for said first gate means, said first gate means having two inputs respectively controlled by timing signals from said timing means and jump instructions from said instruction decoding means.

* * * * *